May 10, 1960   H. W. ROCKWELL ET AL   2,936,038
ARTICULATED SELF-PROPELLED EARTH MOVING VEHICLE
Filed March 11, 1959   3 Sheets-Sheet 1
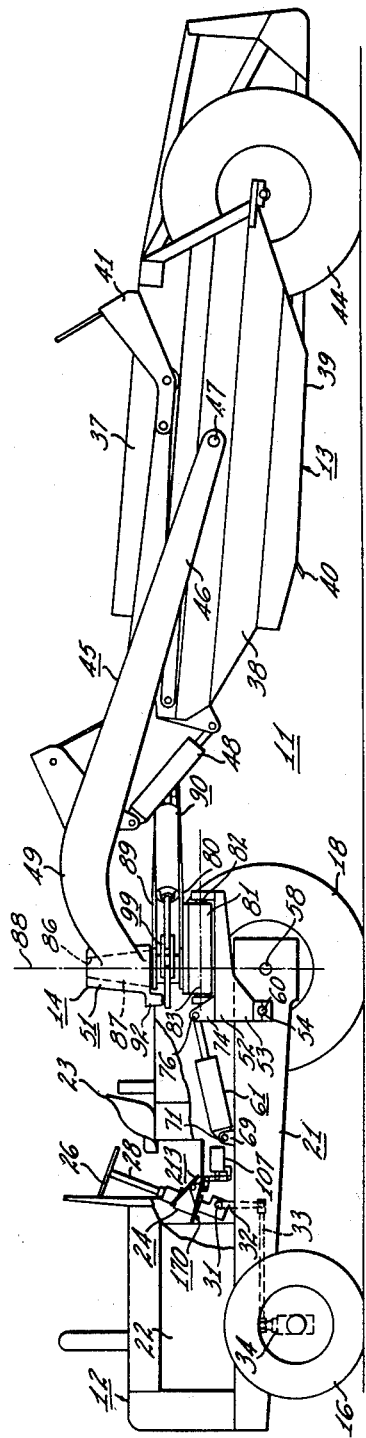
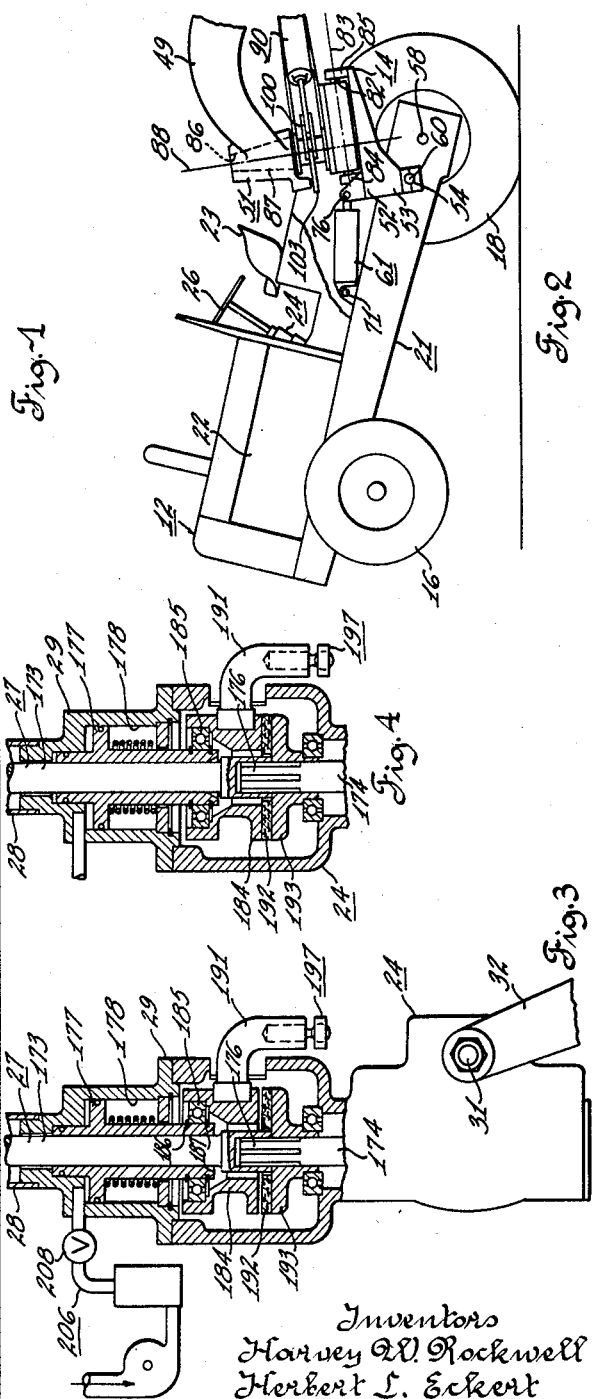
Inventors
Harvey W. Rockwell
Herbert L. Eckert
Attorney

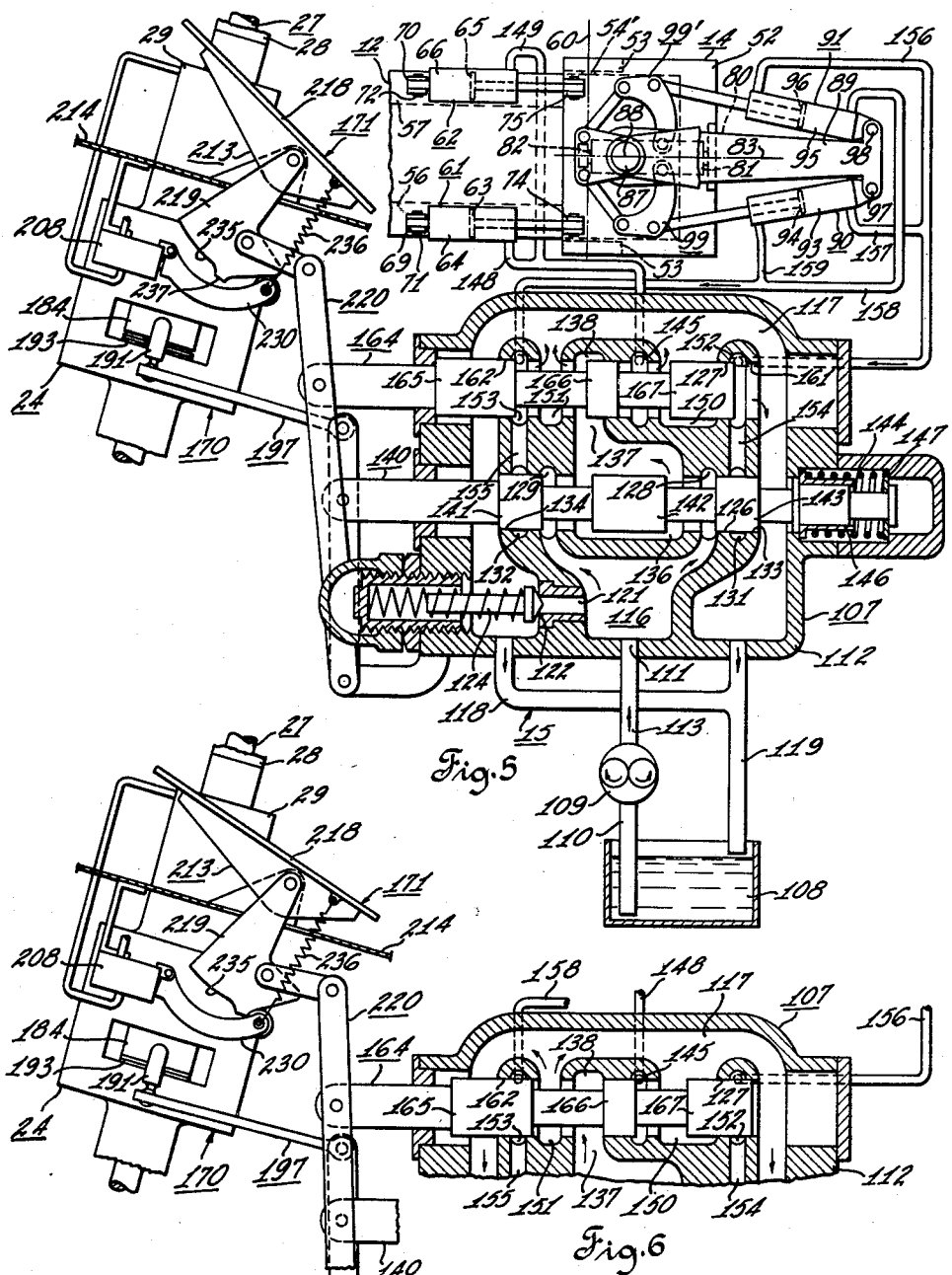

United States Patent Office 2,936,038
Patented May 10, 1960

2,936,038

ARTICULATED SELF-PROPELLED EARTH MOVING VEHICLE

Harvey W. Rockwell and Herbert L. Eckert, Cedar Rapids, Iowa, assignors to Allis-Chalmers Manufacturing Company, Milwaukee, Wis.

Application March 11, 1959, Serial No. 798,646

9 Claims. (Cl. 180—79.2)

This invention relates generally to a self-propelled earth moving vehicle of the type having a two axle tractor unit articulated with a single axle trailing unit and adapted to operate as a three axle vehicle and as a two axle vehicle alternatively. More particularly this invention is concerned with a hitch apparatus for connecting the tractor unit with the trailing unit and which permits guiding of the vehicle by means of the steerable tractor wheels during operation as a three axle vehicle and permits conversion of the vehicle into a two axle unit to be guided by an auxiliary wagon type steering system.

When an earth moving vehicle of this general character is operated as a three axle unit, it is basically the same as and has all the advantages of the well known tractor and semitrailer truck. Some of these advantages are: high speed, heavy duty, on highway transportation; relatively slow and very precise steering; lack of the characteristic rhythmic pitch and toss inherent in two axle earth moving vehicles; location of the operator station between axles resulting in greater comfort and a more stable control platform; and a power train into which conventional components may be easily adapted.

On the other hand a two axle off highway self-propelled earth moving vehicle has some notable advantages over a three axle self-propelled earth moving vehicle that is particularly designed for off highway operation. Some of these advantages are: much better maneuverability and smaller turning radius especially when using a ninety degree wagon type steering system; more weight on the driving axle which results in improved traction; and ability to free the vehicle from ruts, mud holes, etc. by "duck walking," the latter expression of course, referring to manipulating of the wagon type steering to change the location and the direction of the tractive force exerted by the driving wheels.

It has been suggested that some of the advantages of the two axle vehicle may be incorporated into the three axle vehicle by providing a weight transfer system which is capable of tilting the tractor about a horizontal transverse axis with respect to the trailer until the tractor's front wheels are raised off the ground. In other words the three axle vehicle may be physically converted into a two axle vehicle as desired. Also, once the tractor's front wheels are out of frictional engagement with the ground, an auxiliary wagon type steering system must be provided in order to guide the two axle vehicle.

A representative vehicle of this sort is disclosed in U.S. Patent 2,374,410 to A. K. Brumbaugh, issued April 24, 1945. Brumbaugh's tractor and trailer are interconnected by a hitch apparatus comprising a weight transfer system and an elaborate mechanical linkage including a locking plate, a spring loaded locking pin and a special steering plate block cylinder all designed to mechanically couple a wagon type steering mechanism for the tractor and trailer whenever the vehicle is converted from three axle to two axle operation.

This structure though effective in its range has a number of limitations. For example, a locking pin which moves with the trailer unit must be precisely aligned with a locking notch which moves with the tractor unit in order to effectively engage the wagon type steering mechanism. This means that the wagon type steering system may not be activated unless the tractor is first properly aligned with the trailer. Also to guard against a mishap, Brumbaugh has provided an elaborate hydraulic circuit and control means which permit tilting of the tractor only when proper conditions prevail such as precise alignment of tractor and trailer.

In order to make a vehicle of this general type commercially feasible, the components of the hitch apparatus must have a simplicity of construction and must permit a rapid conversion from three axle operation to two axle operation without regard to alignment of the tractor with respect to the trailer. While in the midst of carrying out an earth moving task, it is obviously not desirable to bring the vehicle into precise alignment whenever it becomes necessary to resort to the high traction two axle operation. It will also be apparent that an elaborate hitch mechanism is expensive to manufacture and requires considerable maintenance in order to keep it functioning properly.

It is, therefore, an object of the present invention to provide an improved hitch apparatus for the type of vehicle described which will overcome the disadvantages as hereinbefore outlined in an entirely satisfactory manner.

It is a further object of this invention to provide an improved hitch apparatus for the type of vehicle described which has a simplicity of construction and permits rapid conversion from three axle operation to two axle operation regardless of the angular position of the tractor with respect to the trailer.

It is a further object of the present invention to provide an improved hitch apparatus for the type of vehicle described which permits rapid activation of both an auxiliary wagon type steering system and a weight transfer system regardless of the angular alignment of the tractor with respect to the trailer.

Still another object of the present invention is to provide an improved hitch apparatus for the type of vehicle described, permitting free articulation of the tractor unit with the trailer unit about a vertical pivot axis, a horizontal transversely extending pivot axis and a horizontal longitudinally extending pivot axis during three axle operation and which permits an auxiliary wagon type steering system to be activated directly by means of a simple fluid pressure system.

Other objects and advantages of this invention will become apparent when the foregoing description is read in conjunction with the appended drawings in which:

Fig. 1 shows a schematic side view of a two axle tractor unit articulated with a single axle scraper unit and having a portion of the tractor body cut away to show details of the hitch apparatus;

Fig. 2 shows the tractor unit of Fig. 1 in a weight transfer or tilted position with respect to the scraper unit wherein the front wheels are raised off the ground, a portion of the tractor body being cut away to show the disposition of the hitch apparatus between the tractor and scraper units;

Fig. 3 shows the manually operated steering mechanism for controlling the tractor's front steerable wheels; and also shows the auxiliary steering mechanism for controlling the wagon type steering system in the disengaged position;

Fig. 4 is a section view of the steering mechanism of Fig. 3 with the auxiliary steering mechanism in the engaged condition;

Fig. 5 shows the hitch apparatus for the vehicle of Fig. 1; and also shows a diagrammatic view of the hydraulic system including the weight transfer and auxiliary steering jacks and the hydraulic control valving therefor in the "float" position;

Figure 7:
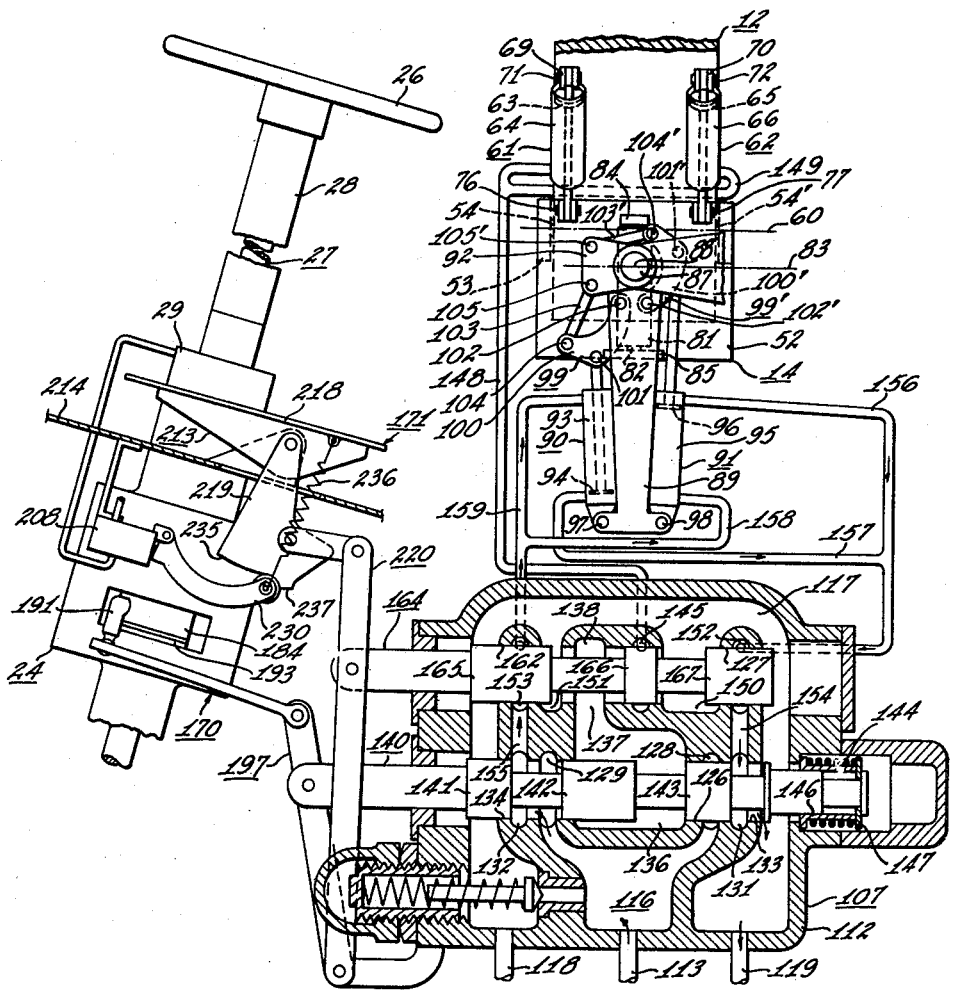

Fig. 6 shows the weight transfer valve spool shifted to the right placing the steering valve system of Fig. 5 in the "hold" position; and Fig. 7 is similar to Fig. 5 showing the weight transfer valving and control linkage in the weight transfer hold position, as shown in Fig. 2, with the steering valve spool being displaced to the left placing the steering valve system, steering jacks and hitch apparatus in the right turn position.

Self-propelled vehicle

Referring to Figs. 1 and 2, the articulated self-propelled earth moving vehicle 11 is adapted to be operated as a three axle vehicle at high speed and low traction requirements, as shown in Fig. 1, and as a two axle vehicle at lower speeds and high traction requirements, as shown in Fig. 2. Vehicle 11 is comprised of a tractor unit 12 which is articulated with a scraper unit 13 by means of a hitch apparatus 14. Hitch apparatus 14 is operated by a fluid pressure system 15, best shown in Fig. 5, as will be described in detail hereinbelow.

Tractor unit

Tractor 12 is a two axle type of unit particularly suited for drawing scraper 13 and includes a pair of front inflated rubber tired dirigible steering wheels 16, only one of which is visible, and a pair of inflated rubber tired driving or traction wheels 18, only one being shown. The tractor wheels 16 and 18 are carried on the main frame 21 in the conventional manner. Main frame 21 of the tractor is a unitary structure which carries a forward mounted engine 22; a conventional power train for driving wheels 18 including transmission and differential gearing, not shown; and an operator's station 23.

Tractor 12 is guided by means of steerable wheels 16 which are controlled by a steering mechanism 24, shown also in Figs. 3 and 4. Steering mechanism 24 includes the usual steering hand wheel 26 which is fixed on a steering post or shaft 27, best shown in Figs. 3 and 4, that is carried within a steering column 28 attached on a housing 29 which in turn is supported on the tractor main frame 21. Output or rock shaft 31 is journaled in housing 29 and is drivingly connected with the manually operable steering shaft 27 by means of the conventional type worm gearing, not shown. A pitman arm 32 is carried on rock shaft 31 and is connected by means of a connecting rod 33 with the steering knuckles assembly 34 which is of the well known Ackerman type. A power assist, not shown, may be incorporated into the Ackerman steering linkage in the conventional manner for augmenting the steering of the dirigible tractor wheels 16.

Scraper unit

Referring to Fig. 1, the scraper unit is of the well known single axle type having an earth receiving bowl 37; a pair of laterally opposite side walls 38, only one of which is shown; and and a bottom 39 which at its forward end is provided with a cutting blade 40. The rear of the bowl 37 is normally closed by the ejector 41 which is adapted to be moved forward through the bowl, in the conventional manner, to discharge material that has been collected therein. The front of the scraper bowl is closed by an apron, not shown, which is also of conventional design, being pivoted to the ejector 41. Bowl 37 is supported adjacent its rearward end by a pair of transversely spaced inflated rubber tired ground engaging wheels 44, only one of which is shown. The forward end of bowl 37 is supported by a yoke or draft frame 45 which includes a pair of side arms 46, only one being shown, pivotally connected respectively to the side walls 38 by means of pins 47, only one of which is shown. Bowl 37 is adapted to be lowered into a loading position and raised to a travel position in the usual manner by means of a double acting hydraulic jack 48. The forward end of the draft frame 45 is provided with the conventional gooseneck 49. Integral with the forwardmost portion of gooseneck 49 is a king pin housing 51 for connecting the scraper unit 13 with the hitch apparatus.

Hitch apparatus

Referring to Figs. 1, 2 and 5, hitch apparatus 14 provides the means whereby the tractor 12 may be articulated with the scraper 13 about a vertical, a transverse horizontal and a longitudinal pivot axis. The hitch apparatus 14 comprises a base plate member 52 having a pair of journal brackets 53 connected by means of pins 54 and 54' on the opposite lateral side beams 56 and 57 of the tractor main frame 21. Pins 54 and 54' are positioned forwardly of and slightly above the rear axle 58 of the tractor and share a common, horizontal pivot axis extending transversely of the tractor and indicated by the reference numeral 60.

A pair of single acting weight transfer hydraulic jacks 61 and 62, respectively, are operatively interposed between the tractor main frame 21 and the base plate 52. Jack 61 includes a ram element 63 which is relatively expansible and contractible within cylinder element 64; and jack 62 includes a ram element 65 which is relatively movable within cylinder element 66. Cylinders 64 and 66 are respectively connected to the tractor main frame side beams 56 and 57 by means of brackets 69 and 70 and pins 71 and 72; and the rams 63 and 65 are connected respectively to opposite sides of the base plate 52 by means of brackets 74 and 75 and pins 76 and 77. Base plate 52 is free to pivot about pivot axis 60 during three axle operation of vehicle 11, but during two axle operation plate 52 is restrained by weight transfer jacks 61 and 62 whose control by the hydraulic system 15 will be explained in further detail hereinbelow.

A second hitch member 80 includes a sleeve portion 81 carried on an elongated pin 82 which is supported at opposite axial ends respectively by upstanding brackets 84 and 85 that are rigidly attached on the base plate 52. Pin 82 provides a horizontal pivot axis 83 which extends longitudinally of tractor 12. Hitch member 80 is free to oscillate about axis 83 through a limited arc during three axle as well as two axle operation of vehicle 11.

An upstanding king pin 87 is rigidly carried on the sleeve portion 81 and provides a vertical pivot axis 88 which is perpendicular to pivot axis 83. The king pin 87 is journaled by suitable bearings within a bore 86 provided in the king pin housing 51.

An elongated subframe structure 89 is rigidly connected on the sleeve portion extending rearwardly of the king pin 87 and underneath the arc of gooseneck 49. Subframe 89 carries a pair of double acting hydraulic jacks 90 and 91 that serve as the motor means for the auxiliary wagon type steering. During three axle operation of vehicle 11, tractor 12 is free to articulate with scraper 13 about pivot axis 88; but during two axle operation jacks 90 and 91 control the relative angling about axis 88.

The hydraulic cylinders 93 and 95 of jacks 90 and 91 are pivotally connected respectively in thrust transmitting relationship with the rearward portion of the subframe 89 by means of vertical pivot pins 97 and 98, and rams 94 and 96 of jacks 90 and 91 are connected respectively to torque arm 92 of king pin housing 51 by means of the thrust transmitting linkages 99 and 99'. The components of linkages 99 and 99' are best shown in Fig. 7 and include lever plates 100 and 100', pins 101 and 101', 102 and 102'; and links 103 and 103', and pins 104 and 104', and pins 105 and 105'.

The structural details and arrangement of linkages 99 and 99′ and their coaction with hydraulic steering jacks 90 and 91 are disclosed in the copending application of H. W. Rockwell, Serial No. 628,593, filed December 17, 1956, now Patent No. 2,885,022. The advantage of this particular mounting arrangement for hydraulic steering jacks is that it permits angling between the tractor and scraper of approximately ninety degrees on either side of the straight ahead operating position. It should be understood, however, that it is not intended to limit the invention to the details of this type of steering linkage as any means for connecting one of the pair of relatively movable members of a double acting auxiliary steering motor in thrust transmitting relationship with hitch member 80, and for connecting the other of the relatively movable members in thrust transmitting relationship with the scraper draft frame 45 will be satisfactory for carrying out the invention.

Jacks 61 and 62 may properly be called "weight transfer motors" because as they are contracted the tractor front wheels will be raised off the ground thereby transferring to the tractor rear wheels a portion of the weight on the trailer wheels in addition to that portion of the vehicle's weight normally supported by the front wheels. The tractor and scraper have thus been converted into a two axle vehicle; and since the tractor rear wheels are the driving wheels, optimum traction is assured. It should also be understod that the reference to jacks 61 and 62 as being single acting is not intended to necessarily limit the invention. For instance, it is well known in the art that a double acting jack may be connected into a hydraulic system in such a manner that one end of the cylinder is in permanent communication with a sump or reservoir and the other end is connected so as to receive pressurized fluid from a control valve. A double acting jack connected thusly is obviously operative as a single acting fluid motor. Also, it is conceivable that a double acting fluid motor might be employed in place of the single acting fluid jacks.

Various kinds of hydraulic control valve systems may be employed to control the weight transfer motors 61 and 62. It is essential, however, that the control valve provide a "float" position for the motors so that the tractor will be free to articulate with the scraper about transverse horizontal pivot axis 60; a "raise" position wherein fluid is directed into cylinders 64 and 66 in order to contract the motors; and a "hold" position wherein motors 61 and 62 may be hydrostatically locked in order to maintain the tractor in a tilted condition with respect to the scraper, as shown in Fig. 2.

Jacks 90 and 91 may be thought of as "auxiliary" steering motors because they are to be activated for guiding the vehicle during two axle operation and in emergency situations during three axle operation. Such an emergency situation might arise for example while operating the vehicle over a slippery roadway, and the auxiliary steering motors may be activated in order to prevent "jackknifing" of the tractor and scraper or to simply supplement the front wheel steering.

Various hydraulic control valve designs may be employed to control the operation of auxiliary steering motors 90 and 91. It is essential, however, that jacks 90 and 91 have a "float" position in order to permit free articulation of tractor 12 with scraper 13 about vertical axis 88 during three axle operation; and a right turn and left turn position. A "hold" position is also desirable in order to effectively hydrostatically lock jacks 90 and 91 in the straight ahead or in any angled condition of the vehicle. It is also contemplated that the control valve system for operating the weight transfer motors 61 and 62 may be coordinated and synchronized with the control valve system for operating the auxiliary steering motors so that the latter will be automatically activated whenever the tractor front wheels are lifted out of steering engagement with the ground.

Hydraulic system

Hydraulic system 15, which has been selected to illustrate the operation of hitch apparatus 14, is also disclosed in a copending application of R. M. Anderson, Serial No. 795,509, filed February 25, 1959, entitled Hydraulic Control System. This system affords a convenient means for synchronizing the operation of weight transfer jacks 61 and 62 with the operation of the auxiliary steering jacks 90 and 91. It should be understood, however, that it is not intended to limit this invention to the particular sequence of control position and other structural details of hydraulic system 15.

Referring to Fig. 5, the hydraulic system 15 comprises a two spool hydraulic control valve 107, a hydraulic fluid reservoir 108 and an engine driven hydraulic pump 109 which receives fluid from the reservoir by means of an intake conduit 110. Pump 109 delivers pressurized hydraulic fluid to the pump port 111 of a two spool control valve housing 112 by means of conduit 113. Pump port 111 in turn communicates with an inlet chamber 116 formed within housing 112 of control valve 107. An exhaust passage 117 is formed by the interior walls of valve housing 112. Hydraulic fluid is returned from exhaust passage 117 to reservoir 108 by means of return conduits 118 and 119.

Interconnecting the inlet chamber 116 and exhaust passage 117 is a relief passage 121 having a relief port 122 for seating a spring loaded relief valve 124. Relief valve 124 is of the conventional design and construction and serves to prevent an undesirable pressure build up by opening the inlet chamber 116 for fluid communication with the exhaust chamber 117 in response to excessive pressure within chamber 116.

Control valve 107 in effect has two separate control valve systems, one serving as a weight transfer valve system for controlling the single acting weight transfer jacks 61 and 62 and the second serving as a steering valve system for controlling the operation of the auxiliary steering jacks 90 and 91.

A pair of spaced parallel valve spool bores 126 and 127 are formed respectively within housing 112. Valve spool bore 126 is a basic part of the auxiliary steering control valve system and has formed therein a pair of spaced annular inlet ports 128 and 129; a pair of annular load ports 131 and 132; a pair of exhaust ports 133 and 134 formed respectively at the intersection of the bore 126 and the exhaust chamber 117; and an annular outlet port 136. Port 136 is connected by a cross passage 137 with an annular inlet port 138 formed within bore 127.

Carried in bore 126 is an elongated valve spool 140 having a series of land portions 141, 142 and 143 formed thereon for controlling interport flow within bore 126 in the usual manner. A biasing spring 144 is carried on one end of spool 140 and is confined between slidable sleeve 146 and flange member 147. Sleeve 146 and flange 147 in turn transmit thrust between the valve spool and housing 112 to effectively center spool 140 in the position shown in Fig. 5.

Bore 127 is a basic part of the weight transfer control valve system and has an annular load port 145; and an inlet port 138. Port 145 is interconnected for fluid communication with cylinders 64 and 66 of weight transfer jacks 61 and 62 by means of conduits 148 and 149. Also formed within bore 127 are a pair of annular exhaust ports 150 and 151; a pair of annular relay ports 152 and 153; and exhaust ports 161 and 162. Ports 152 and 153, respectively, are cross connected for communication with load ports 131 and 132 by means of cross connecting passages 154 and 155 formed within housing 112. Both of ports 152 and 153 are also cross connected for fluid communication with one end of each of cylinders 93 and 95, respectively, by means of conduits 156 and 157, and conduits 158 and 159.

A valve spool 164 having land portions 165, 166 and 167 is carried within bore 127 for controlling interport flow therein in the usual manner. Because relay ports 152 and 153 and load ports 145 are all located within the valve bore 127, valve spool 164 is operative to control a "float" and a "hold" position for the auxiliary steering jacks 90 and 91, as well as the weight transfer jacks 61 and 62 which will be more fully explained hereinbelow.

Referring to Figs. 3, 4 and 5, the manually actuated vehicle steering and control apparatus 170 is illustrated which provides a means for manually manipulating control valve 107. Apparatus 170 includes a weight transfer actuating mechanism 171 and a steering mechanism 24. Actuating mechanism 171 provides a means for manually adjusting the weight transfer valve spool 164 to operate the weight transfer jacks 61 and 62. Steering mechanism 24 provides a means for guiding the tractor front wheels in a conventional manner during three axle operations of the vehicle, and also incorporates an auxiliary steering actuating device for adjusting the steering valve spool 140 which controls steering jacks 90 and 91. Apparatus 170 is also disclosed in the copending application of H. W. Rockwell Serial No. 801,221, filed March 23, 1959, entitled Vehicle Steering and Control Apparatus. Although this apparatus provides a convenient means for manually controlling vehicle 11 by selectively actuating spools 140 and 164 of control valve 107, it is not intended to limit this invention to the structural details of apparatus 170. In order to fully explain the best known means for performing the present invention it will be necessary to briefly describe the structure of apparatus 170.

*Vehicle steering and control apparatus*

Referring to Figs. 3 and 4, steering shaft 27 includes an upper shaft 173, one end of which is journaled within housing 29 by suitable bearings and is drivingly connected with a lower shaft 174 by means of a splined connection at 176. Shaft 174 is suitably journaled within housing 29 and is drivingly connected with rock shaft 31 by means of conventional worm gearing, not shown.

A fluid pressure cylinder 178 is formed by the interior walls of housing 29 and is coaxial with the steering shaft 27. A piston member 177 is slidably carried within cylinder 178. A clutch member 184 is rotationally carried on piston member 177 by means of ball bearings 185 and is held in axially fixed thrust transmitting relationship therewith by means of retainer rings 186 and 187. Integrally fixed on clutch member 184 is an auxiliary steering actuating lever 191 which is operative to transmit rotational motion to adjust the axial displacement of valve spool 140. A second clutch plate 193, having a friction facing 192, is splined on the lower steering shaft 174 and is complementary to and engageable with clutch member 184.

In order to transmit motion from steering wheel 26 to lever 191 clutch members 184 and 193 must be frictionally engaged. Movement of lever 191 is then transmitted to valve spool 140 by means of a motion translating linkage 197, shown in Fig. 5, whereby rotational movement of steering wheel 26 displaces valve spool 140 in an axial direction.

Referring to Fig. 3, the diagrammatically illustrated air pressure system 206 supplies air under pressure to cylinder 178 for bringing about engagement of clutch members 184 and 193 whereby the auxiliary steering actuating lever 191 is connected for rotation with the manual steering shaft 27. Air pressure system 206 is of the conventional type and includes a control valve 208. Control valve 208 has two positions, open and closed. In the open position valve 208 directs compressed air to cylinder 178 for activating piston 177 to engage clutch members 184 and 193. Valve 208 is biased to the "closed" position and is adjusted to the "open" position by means of the weight transfer actuating mechanism 171. Valve 208 thereby serves to synchronize the manual actuation of the weight transfer valve system with that of the auxiliary steering valve system as will be presently explained in detail.

Referring to Fig. 5, the weight transfer actuating mechanism 171 includes a pedal assembly 213 which is pivotally mounted on the floor plate 214 of the tractor 12. Assembly 213 includes a foot pedal plate 218 which is to be controlled by the operator's left foot. A lever portion 219 of the pedal assembly 213 is integral with pedal plate 218 and extends below floor plate 214 through a suitable opening therein. Pedal assembly 213 is operatively connected with valve spool 164 by means of a motion translating linkage 220 whereby pivotal movement of pedal 218 will displace the weight transfer spool 164 axially within bore 127.

Foot pedal 218 also effectively serves to actuate valve 208 which, as previously mentioned, regulates the compressed air flow to and from air cylinder 178. Valve 208 is actuated by a cam follower 230 which engages a cam 235 formed on lever portion 219. The cam follower is held in thrust transmitting relation with cam 235 by means of a tension spring 236. As pedal assembly 213 is pivoted, valve 208 is manipulated between an open and closed position. Spring 236 is also effective to bias pedal 218 in a nonoperating position, as shown in Fig. 5, which corresponds to the steering "float" weight transfer "float" position of spool 164. A projection 237 is formed on the surface of cam 235 and acts as a detent for cam follower 230 so as to hold the pedal assembly 213 in an intermediate control position corresponding to the steering "hold" weight transfer "hold" position of valve spool 164, as shown in Fig. 8.

*Operation*

Referring to Figs. 1, 3 and 5, the steering mechanism 24 and the weight transfer mechanism 170 are shown in the normal position during operation of the tractor and scraper as a three axle vehicle. In this condition vehicle 11 is being guided by the tractor's dirigible front wheels 16.

Referring specifically to Fig. 5, the weight transfer jacks 61 and 62 and the auxiliary steering jacks are in the "float" position. Arrows drawn within the passages in valve housing 112 indicate that cylinders 64 and 66 of weight transfer jacks 61 and 62 communicate freely with exhaust passage 117 through load port 145 and exhaust port 150; and that both ends of cylinders 93 and 95 of auxiliary steering jacks 90 and 91 communicate freely with the exhaust passage 117 through relay ports 152 and 153, and exhaust ports 151 and 161. In this condition rams 63 and 65, and 94 and 96 are allowed to float in their respective cylinders and hitch apparatus 14 permits free articulation of the tractor 12 with respect to the scraper 13 about the vertical pivot axis 88, transverse horizontal axis 60 and longitudinal axis 83.

The fluid pressure control system 15 is so designed that the auxiliary wagon type steering system may be independently engaged without the tractor front wheels being lifted off the ground. To activate the auxiliary steering control valve system the operator depresses foot pedal 218 until the foot pedal assembly 213 is pivoted to its second position, as illustrated in Fig. 6. In this position cam 235 causes cam follower 230 to be pivoted downward thereby actuating the air valve 208 to its open position. In the open position compressed air is directed through valve 208 to air cylinder 178 causing piston member 177 to be displaced downwardly engaging clutch member 184 with clutch member 193. The steering valve spool 140 may now be manipulated by the hand wheel 26.

Pivoting of pedal assembly 213 to the second position, as shown in Fig. 6, also displaces the weight transfer valve spool 164 axially to the right and to its auxiliary steering "hold" weight transfer "float" position wherein relay ports 152 and 153 are closed from communication with the exhaust passage 117 thereby hydrostatically locking rams 94 and 96 in their respective cylinders 93 and 95. Jacks 90 and 91 are now responsive to the axial adjustment of valve spool 140 which has been automatically placed in a "hold" position by the adjustment of valve spool 164 without spool 140 having been shifted from the setting shown in Fig. 5. Jacks 61 and 62, however, are not affected because valve spool 164 maintains the weight transfer "float" position with load port 145 freely communicating with exhaust passage 117.

In the weight transfer "float" auxiliary steering "hold" condition, as illustrated in Fig. 6, the hitch mechanism 14 will permit free articulation of the scraper with respect to the tractor about the transverse horizontal pivot axis 60 and the longitudinal pivot axis 83. The angular relationship of the tractor with respect to the scraper about vertical pivot axis 88 is now positively regulated by means of steering jacks 90 and 91 which are controlled by valve spool 140 which in turn is manipulated by the steering wheel 26.

Upon release of foot pedal 218 from the second position (Fig. 6), the pedal assembly 213 being biased by spring 236 will return to the first position, as shown in Fig. 5. Simultaneously, valve spool 164 will be returned to the auxiliary steering "float" and weight transfer "float" position shown in Fig. 5; and cam follower 230 will be pivoted upwardly thereby adjusting air valve 208 to the closed position which disengages clutch plates 184 and 193, as shown in Fig. 3.

Should maximum tractive power be required as when operating the vehicle over difficult terrain or during the cutting and loading operation of the scraper, the tractor and scraper may be converted into a two axle vehicle by manually actuating the weight transfer mechanism in order to raise the tractor front wheels off the ground.

To initiate weight transfer the foot pedal 218 is depressed to the full actuated position, not shown, which pivots the pedal assembly 213 and actuates air valve 208 to "open" thereby setting off the chain of events which results in rotationally locking the auxiliary steering lever 191 with steering wheel 26, shown in Fig. 4, as hereinbefore described.

It will be apparent that pivoting of pedal assembly 213 to the extreme position will simultaneously move valve spool 164 to the extreme right into the weight transfer "raise" position. In the "raise" position pressurized fluid is directed into the weight transfer jacks 61 and 62 as land portions 165 and 166 are operative to connect load port 145 with inlet port 138. In this position inlet port 138 receives pressurized fluid from inlet chamber 116 through passage 137, as shown in Fig. 5. In response to the power fluid, weight transfer jacks 61 and 62 are contracted which pivots plate 52 about axis 60 whereby the tractor is tilted with respect to the scraper and both will then pivot about the tractor's rear axle 58. As will be apparent, the degree of tilting is under the operator's control; and if necessary, the tractor's front wheels may be raised off the ground as much as thirty inches, which is the condition shown in Fig. 2.

Referring to Fig. 7, upon release of the foot pedal 218, spring 236 will return pedal assembly 213 to the intermediate position, which corresponds to a weight transfer "hold" steering "hold" position of valve spool 164. The pedal is retained in this position due to the cam follower 230 engaging projection 237 on cam 235. With valve spool 164 disposed in the weight transfer "hold" position, land portion 166 closes load port 145 from communication with the exhaust passage 117 which hydrostatically locks jacks 61 and 62 in the contracted condition whereby the tractor may be held in any preselected degree of tilted condition.

Assuming now that it is necessary to deploy the wagon type auxiliary steering so as to guide the vehicle to the right, steering wheel 26 is turned clockwise, as viewed from the operator's station 23. Movement of steering wheel 26 in this direction simultaneously rotates auxiliary steering lever 191 in a clockwise direction and displaces the steering valve spool 140 to the left and into the "right turn" position as shown in Fig. 7. In the "right turn" position inlet port 129 is connected for communication with load port 132 so that pressurized fluid is transmitted through cross connection passage 155 and relay port 153 to the rearward end of cylinder 95 and to the forward end of cylinder 93; and load port 131 is connected with exhaust port 133 so that trapped fluid in the forward end of cylinder 95 and the rearward end of cylinder 93 may be evacuated to the exhaust passage 117. This results in steering jack 91 being expanded and steering jack 90 being contracted. The reactive force of jacks 90 and 91 is transmitted between the tractor and scraper causing vehicle 11 to be angled to the right about the vertical king pin axis 88.

Although Fig. 7 illustrates the maximum ninety degree angled position to the right, it will be apparent that any desired degree of angling is obtainable by simply releasing the hand wheel allowing spring 144 to center spool 140 in the steering "hold" position. This, of course, will hydrostatically lock steering jacks 90 and 91 in their respective expanded and contracted conditions.

It will be obvious that when it is necessary to return the vehicle from the "right turn" position to straight ahead operation or to angle the tractor to the left about axis 88, steering wheel 26 is simply turned in a counterclockwise direction. The simultaneous counterclockwise rotation of lever 191 displaces spool valve 140 to the right opening load port 131 for communication with inlet port 128 thereby directing pressurized fluid to the rearward end of cylinder 93 and the forward end of cylinder 95; and connecting load port 132 and exhaust port 134 so that the rearward end of cylinder 95 and the forward end of cylinder 93 communicate with the exhaust passage 117. In this position jack 90 will be expanded and jack 91 will be contracted. If the wheel 26 is held in the left turn position, the tractor unit will swing to the left about pivot axis 88 until it eventually reaches a ninety degree left turn position. Any degree of leftward angling may be obtained by simply returning valve spool 140 to the centered position shown in Fig. 5.

In order to return the vehicle from the two axle tilted condition of Fig. 2, to the three axle condition of Fig. 1, foot pedal 218 is simply returned from the intermediate position of Fig. 7 to the first position of Fig. 5 which moves valve spool 164 to the left and opens cylinders 64 and 66 for communication with the exhaust passage 117, as shown in Fig. 5. As foot pedal 218 is returned to the first position, air valve 208 is automatically closed and the auxiliary steering actuating mechanism is disengaged so that the three axle vehicle is guided by the steerable front wheels 16 of the tractor under the control of steering wheel 26.

From the foregoing detailed description it will be apparent that a simplified and improved hitch apparatus has been illustrated which completely eliminates the complex hydraulic actuated mechanical linkages and interlocks formerly employed for connecting an auxiliary steering motor in thrust transmitting relationship with a two axle tractor and a single axle trailer. In the improved hitch apparatus one of the pair of relatively movable elements of the steering motors is at all times connected in thrust transmitting relationship with the scraper unit and the other of the movable elements is at all times connected in thrust transmitting relationship with the tractor unit. This permits the steering motor to be directly activated for conrolling the angular relationship of the tractor and trailer about a vertical pivot axis by simply hydraulically engaging the steering motor.

It is to be understood that this invention is not to be limited to the details of the embodiment described herein otherwise than is necessitated by the scope of the appended claims.

Having now particularly described and ascertained the nature of this invention and the manner in which it is to be performed, we declare that what we claim is:

1. In an articulated self-propelled earth moving vehicle of the type adapted to operate as a three axle vehicle and a two axle vehicle alternatively and including a tractor unit having two axles and steerable front wheels, and a trailer unit having one axle, a hitch apparatus comprising: first and second hitch members interconnected for relative pivotal movement on a first horizontal pivot axis, said first hitch member being connected to said tractor unit for relative pivotal movement on a second horizontal pivot axis, one of said horizontal axes extending transversely of and the other of said horizontal axes extending longitudinally of the vehicle, said second hitch member being connected to said trailing unit for relative pivotal movement on a vertical pivot axis; a first fluid motor means for converting the three axle vehicle into a two axle vehicle by tilting the tractor relative to said trailer about the transverse horizontal axis, said first fluid motor means including a pair of relatively movable elements being operatively interposed between said trailer unit and said tractor unit; an auxiliary steering fluid motor means for controlling relative angling between said tractor and trailer units about said vertical pivot axis, said steering fluid motor means having a pair of relatively movable elements, one of said elements being operatively connected in thrust transmitting relationship with said second hitch member and the other of said elements being operatively connected in thrust transmitting relationship with said trailing unit; and fluid pressure means including control valving for operating said fluid motor means, said control valving being adjustable to permit free relative movement of the movable elements of said auxiliary steering fluid motor means during operation of the tractor and trailer as a three axle vehicle whereby said tractor unit is free to articulate with said trailer about said vertical pivot axis.

2. The combination set forth in claim 1 wherein said control valve means includes a first manually operable valve system for controlling said first fluid motor means, and having an operating position for effecting positive relative movement of the movable elements of said first fluid motor in one direction to tilt the tractor unit relative to the tilting unit thereby raising the tractor's front wheels off the ground, and a second operating position for permitting relative movement of said element in the opposite direction to restore said tractor unit from the tilted condition; and wherein said control valving also includes a second manually operable valve system for controlling said steering motor means, said second valve system having two operating positions for positively relatively moving the pair of elements of said steering motor means in opposite directions alternatively.

3. The combination set forth in claim 1 wherein said first fluid motor means includes a single acting hydraulic jack and said auxiliary steering motor means includes a double acting hydraulic jack.

4. The combination set forth in claim 3 wherein the control valving provides a "float" position permitting simultaneous free expansion and contraction of said hydraulic jacks during operation of the tractor and trailer as a three axle vehicle.

5. In an articulated self-propelled earth moving vehicle of the type being adapted to operate as a three axle vehicle and as a two axle vehicle alternatively and including a tractor unit having two axles and steerable front wheels, and a trailer unit having one axle and a hitch apparatus comprising: first and second hitch members being interconnected for relative pivotal movement on a first horizontal pivot axis, said first hitch member being connected to said tractor unit for relative pivotal movement on a horizontal pivot axis normal to said first pivot axis, one of said horizontal axes extending transversely of the vehicle, said second hitch member being connected to said trailing unit for relative pivotal movement on a vertical pivot axis; a first hydraulic motor means including a pair of relatively movable elements and being operatively connected between one of said hitch members and said tractor unit, for converting the vehicle from a three axle to a two axle vehicle by tilting the tractor unit relative to said trailer unit about the transverse horizontal axis whereby the tractor's steerable front wheels are raised off the ground, said first motor means also being operative to permit free relative movement of said pair of elements during three axle operation; a hydraulic auxiliary steering motor means having a pair of relatively movable elements respectively being connected in thrust transmitting relationship with said second hitch member and said trailer unit during both three axle and two axle operations, said steering motor means permitting free relative movement of its elements during three axle operation and being hydraulically activated during two axle operation for controlling relative angling between said tractor and trailer units about said vertical pivot axis; and fluid pressure means including control valving for selectively operating said first hydraulic motor means and said hydraulic steering motor means.

6. In an articulated self-propelled earth moving vehicle of the type adapted to operate as a three axle vehicle and as a two axle vehicle alternatively and including a tractor unit having a main frame, a pair of steerable wheels carried on a front axle and a pair of traction wheels carried on a rear axle, and a trailer unit having one axle, a hitch apparatus comprising: first and second hitch members being interconnected for relative pivotal movement on a first horizontal pivot axis extending longitudinally of the vehicle, said first hitch member being connected to said tractor unit for relative pivotal movement on a horizontal pivot axis extending transversely of the vehicle, said second hitch member being connected to said trailer unit for relative pivotal movement on a vertical pivot axis; a hydraulic weight transfer jack having one end pivotally connected to said first member and having the opposite end pivotally connected to said main frame, said first jack being operative to tilt said tractor unit relative to said trailing unit about the transverse horizontal axis thereby raising the tractor front wheels off the ground and converting the tractor and trailer from a three axle to a two axle vehicle; means including a hydraulic auxiliary steering jack having one end connected in thrust transmitting relationship with said second hitch member and the opposite end connected in thrust transmitting relationship with said trailing unit for controlling relative angling between said units about said vertical pivot axis; and fluid pressure means including control valving for selectively operating said hydraulic jacks, said control valving having a "float" position for permitting free expansion and contraction of both said jacks simultaneously.

7. The combination set forth in claim 6 wherein said control valving includes a "raise" position for directing pressurized fluid into said weight transfer jack for activating the latter to raise the tractor's front wheels off the ground; a "hold" position for hydrostatically locking said first hydraulic jack in a tilted condition; and also includes a "left turn" and a "right turn" steering position for said auxiliary steering jack to selectively control relative angling of the tractor and trailer when operating as a two axle vehicle.

8. In an articulated self-propelled earth moving vehicle of the type adapted to operate as a three axle vehicle and as a two axle vehicle alternatively and including a tractor unit having a main frame, front and rear axles carried on said frame with steerable wheels carried on said front axle and traction wheels on said rear axle, and a single axle scraper unit having a forwardly extending draft member, a hitch apparatus comprising: first and second hitch members being interconnected for relative pivotal movement on a first horizontal pivot axis extending longitudinally of the vehicle, said first hitch member being connected to the main frame of said tractor unit for relative pivotal movement on a horizontal pivot axis extending transversely of the vehicle, said second member being connected to the forward end of said draft member for relative pivotal movement on a vertical pivot axis; a hydraulic weight transfer motor disposed in thrust transmitting relationship between said tractor and scraper unit for tilting the former with respect to the latter about said transverse horizontal pivot axis, said weight transfer motor having a pair of relatively expansible and contractible elements one pivotally connected to said first hitch member and the other pivotally connected to said main frame; a horizontally disposed double acting hydraulic steering motor having a pair of relatively movable elements and being operatively interposed in thrust transmitting relationship between said tractor and scraper unit for controlling relative angling of the vehicle about said vertical pivot axis; means for pivotally connecting one of said movable elements on said second member; means for pivotally connecting the other of said movable elements to the forward end of the draft member; and fluid pressure means including a control valve means for selectively operating said hydraulic weight transfer motor and said hydraulic steering motor, said control valve means including a manually operable control valve system having a "float" position permitting free relative movement of the relatively movable elements of the steering motor and having an "operating" position for selectively directing pressurized fluid into said steering motor for positively relatively moving said relatively movable elements thereby effecting relative angling between said tractor and trailer units about said vertical pivot axis, said control valve means also including a manually operable second control valve system for selectively directing pressurized fluid into said weight transfer motor to tilt said tractor unit relative to said trailing unit about the transverse horizonal axis thereby raising the steerable tractor wheels off the ground, said second control valve system also having a "float" position permitting free relative movement of the expansible and contractible elements of said weight transfer motor.

9. An articulated self-propelled earth moving vehicle of the type being adapted to operate as a three axle vehicle and a two axle vehicle alternatively comprising: a two axle tractor unit of the type having a main frame with steerable wheels carried on a front axle and traction wheels on a rear axle; a single axle trailer unit of the type having a forwardly extending draft frame member including a king pin housing formed on the forward end thereof, said housing having a bore extending along a vertical pivot axis; a hitch apparatus for interconnecting said tractor and trailer units including a sleeve member connected to a base plate member for relative pivotal movement on a first horizontal pivot axis extending longitudinally of the vehicle, said base plate member being connected to opposite lateral sides of said main frame adjacent the tractor's rear axle for relative pivotal movement on a horizontal pivot axis extending transversely of the vehicle, said sleeve member having an upright king pin complementary to and detachably journaled within the bore in said king pin housing for relative pivotal movement on said vertical pivot axis; a single acting hydraulic jack having a pair of relatively expansible and contractible elements, one of said elements being pivotally connected to said base plate member and the other of said elements being pivotally connected to said main frame; a horizontally disposed double acting hydraulic jack having a pair of second relatively expansible and contractible elements; means for pivotally connecting one of said second elements in thrust transmitting relationship with said sleeve member; means for pivotally connecting the other of said second elements in thrust transmitting relationship with said draft member; and fluid pressure means including a control valving for selectively operating said hydraulic jacks, said control valving including a manually operable valve member for selectively directing pressurized fluid into one end of said single acting jack to tilt said tractor unit relative to said trailer unit about said transverse horizontal axis thereby raising said steerable wheels off the ground and converting the tractor and trailer from a three axle to a two axle vehicle, said control valving also including a second manually operable valve member for selectively directing pressurized fluid into said double acting jack for expanding and contracting the latter thereby positively controlling relative angling between said tractor and trailer units about said vertical pivot axis during operation as a two axle vehicle, said control valving also provides said jacks with a "float" position permitting free expansion and contraction thereof during operation of the tractor and trailer as a three axle vehicle.

References Cited in the file of this patent

UNITED STATES PATENTS

| | | |
|---|---|---|
| 2,374,410 | Brumbaugh | Apr. 24, 1945 |
| 2,885,022 | Rockwell | May 5, 1959 |